US008683675B2

(12) United States Patent
Yuya et al.

(10) Patent No.: US 8,683,675 B2
(45) Date of Patent: Apr. 1, 2014

(54) METHOD FOR FABRICATING MOLDED STATOR OF ROTARY ELECTRIC MACHINE

(75) Inventors: Masahiro Yuya, Tokyo (JP); Nobuaki Miyake, Tokyo (JP); Yuji Nakahara, Tokyo (JP); Haruyuki Hasegawa, Tokyo (JP); Takenori Aomi, Tokyo (JP); Fumiaki Tsuchiya, Tokyo (JP); Ryoko Komaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 213 days.

(21) Appl. No.: 13/391,391

(22) PCT Filed: Nov. 19, 2009

(86) PCT No.: PCT/JP2009/006238
§ 371 (c)(1),
(2), (4) Date: Feb. 21, 2012

(87) PCT Pub. No.: WO2011/061803
PCT Pub. Date: May 26, 2011

(65) Prior Publication Data
US 2012/0151750 A1 Jun. 21, 2012

(51) Int. Cl.
*H02K 15/00* (2006.01)
(52) U.S. Cl.
USPC .................. 29/596; 29/598; 29/605; 29/606; 29/609
(58) Field of Classification Search
USPC .................. 29/596, 597, 598, 604–606, 609; 310/43, 45, 67 R, 216.004, 216.084
See application file for complete search history.

(56) References Cited

U.S. PATENT DOCUMENTS

| 5,729,072 A | 3/1998 | Hirano et al. |
| 5,859,486 A * | 1/1999 | Nakahara et al. ...... 310/216.004 |
| 7,262,527 B2 * | 8/2007 | Neal .............................. 310/43 |

FOREIGN PATENT DOCUMENTS

| JP | 6-105487 A | 4/1994 |
| JP | 7-298543 A | 11/1995 |
| JP | 9-191588 | 7/1997 |
| JP | 11-98774 | 4/1999 |
| JP | 11-341717 A | 12/1999 |

(Continued)

OTHER PUBLICATIONS

International Search Report (PCT/ISA/210) issued on Jan. 12, 2010, by Japanese Patent Office as the International Searching Authority for International Application No. PCT/JP2009/006238.

(Continued)

*Primary Examiner* — Thiem Phan
(74) *Attorney, Agent, or Firm* — Buchanan Ingersoll & Rooney PC (57) ABSTRACT

Provided is a method for fabricating a molded stator of a rotary electric machine, the method comprising: a lamination step of laminating a plurality of core sheets each having a plurality of core pieces connected to one joining portion via bridge portions, thereby forming a divided-laminated-core group structure; a winding step of winding a coil on a teeth portion of each divided laminated core of the divided-laminated-core group structure; a cutting step of cutting the bridge portions, thereby separating the divided laminated cores wound with the coils; a temporary fixing step of temporarily fixing the divided laminated cores circularly arranged to form a stator; and a molding step of placing, in a mold, the stator into which a mold mandrel is inserted along the inner circumferential surface, and molding an outer circumferential surface of the stator with resin.

8 Claims, 11 Drawing Sheets (56) References Cited

FOREIGN PATENT DOCUMENTS

| | | |
|---|---|---|
| JP | 2003-52138 A | 2/2003 |
| JP | 2007-259609 A | 10/2007 |
| JP | 2009-261150 A | 11/2009 |
| KR | 10-1999-0018330 | 3/1999 |

OTHER PUBLICATIONS

Korean Office Action (Argument Submission Notice) dated May 29, 2013, issued in corresponding Korean Patent Application No. 2012-7012805, and English language translation of Office Action. (8 pages).

* cited by examiner

METHOD FOR FABRICATING MOLDED STATOR OF ROTARY ELECTRIC MACHINE

TECHNICAL FIELD

The present invention relates to a method for fabricating a molded-frame-type stator, of a rotary electric machine, that comprises divided laminated cores.

BACKGROUND ART

Conventionally, a laminated fixed iron core that is composed of a plurality of divided laminated cores which are divided for respective magnetic pole teeth and each of which is composed of two or more core pieces that are laminated and fixed, is known as a stator of a rotary electric machine.

Winding portions perpendicular to the radial direction of the laminated fixed iron core are provided at respective teeth portions of the divided laminated cores. The divided laminated cores are circularly arranged such that the winding portions face toward the center of the circle. A ring-like structure is set so as to surround the divided laminated cores, and these components are integrated by being pressed radially inward, whereby a stator is obtained. A rotary electric machine using such a stator is disclosed.

In addition, a rotary electric machine using the following stator is disclosed. The divided laminated cores are circularly arranged, and adjacent yoke portions are welded or bonded with each other, whereby the divided laminated cores are integrated as a stator (for example, Patent Document 1).

In addition, a stator, of a rotary electric machine, having the following configuration is disclosed. Iron core pieces are laminated to form two kinds of divided laminated cores. Joining portions are provided at both ends, in the circumferential direction, of each yoke portion, and the adjacent divided laminated cores are joined by pins in a rotatable manner (for example, Patent Document 2).

CITATION LIST

Patent Documents

Patent Document 1: Japanese Laid-Open Patent Publication No. 06-105487 (Embodiments 1 to 3 and FIGS. 1 to 3)
Patent Document 2: Japanese Laid-Open Patent Publication No. 2003-52138 (Claim 1 and FIGS. 1 to 6)

SUMMARY OF THE INVENTION

Problems to be Solved by the Invention

In such a stator that comprises divided laminated cores composed of laminated core pieces as in Patent Document 2, in general, concave and convex portions for engaging the adjacent core pieces by being swaged with each other are provided on the upper and lower surfaces of each laminated core piece.

However, stress is applied to the core pieces owing to the swaging process of the concave and convex portions. The stress becomes a factor for disturbing a smooth flow of a magnetic flux.

The present invention has been made to solve the above problems, and an object of the present invention is to provide a method for fabricating a stator of a rotary electric machine in which, regarding divided laminated cores composing the stator of a rotary electric machine, lamination of core pieces, winding of coils, and resin molding of the outer circumferential surface of the stator can be accurately performed without providing concave and convex portions for engagement on the upper and lower surfaces of each core piece.

Solutions to the Problems

In a method for fabricating a molded stator of a rotary electric machine, according to the present invention, a coil is wound on a divided laminated core composed of a plurality of core pieces that are laminated, a plurality of the divided laminated cores are circularly joined, and the outer circumferential surfaces of the plurality of divided laminated cores are molded and fixed. The method comprises: a lamination step of preparing a plurality of core sheets in which core pieces used in the same lamination layer of the divided laminated cores are connected to a joining portion via bridge portions respectively connected to middle portions of the outer circumferences of back yoke portions of the core pieces, and laminating the core sheets to form a divided-laminated-core group structure; a winding step of winding the coil on a teeth portion of each divided laminated core of the divided-laminated-core group structure; a cutting step of cutting the bridge portions of the divided laminated cores wound with the coils, thereby separating the divided laminated cores from the divided-laminated-core group structure; a temporary fixing step of forming a stator by circularly arranging the divided laminated cores that have been cut, and temporarily fixing the outer circumferential portion of the stator; and a molding step of inserting an axial rod having a diameter equal to the inner diameter of the stator, into the stator along the inner circumferential surface of the stator coaxially with the rotational axis of the stator, placing the stator into which the axial rod has been inserted, in a mold, and molding an outer circumferential surface of the stator with resin.

Effect of the Invention

The method for fabricating a molded stator of a rotary electric machine, according to the present invention, comprises: a lamination step of preparing a plurality of core sheets in which core pieces used in the same lamination layer of the divided laminated cores are connected to a joining portion via bridge portions respectively connected to middle portions of the outer circumferences of back yoke portions of the core pieces, and laminating the core sheets to form a divided-laminated-core group structure; a winding step of winding the coil on a teeth portion of each divided laminated core of the divided-laminated-core group structure; a cutting step of cutting the bridge portions of the divided laminated cores wound with the coils, thereby separating the divided laminated cores from the divided-laminated-core group structure; a temporary fixing step of forming a stator by circularly arranging the divided laminated cores that have been cut, and temporarily fixing the outer circumferential portion of the stator; and a molding step of inserting an axial rod having a diameter equal to the inner diameter of the stator, into the stator along the inner circumferential surface of the stator coaxially with the rotational axis of the stator, placing the stator into which the axial rod has been inserted, in a mold, and molding an outer circumferential surface of the stator with resin.

Therefore, it is not necessary to provide concave and convex portions or the like for engagement on the upper and lower surfaces of each core piece of the divided laminated cores composing the stator of a rotary electric machine, whereby stress applied to the core pieces can be significantly reduced.

As a result, a stator, of a rotary electric machine, having an excellent magnetic characteristic and high efficiency can be accurately fabricated.

BEST MODE FOR CARRYING OUT THE INVENTION

Embodiment 1

A method for fabricating a molded stator of a rotary electric machine, according to embodiment 1 of the present invention will be described with reference to the drawings.

Figure 1:
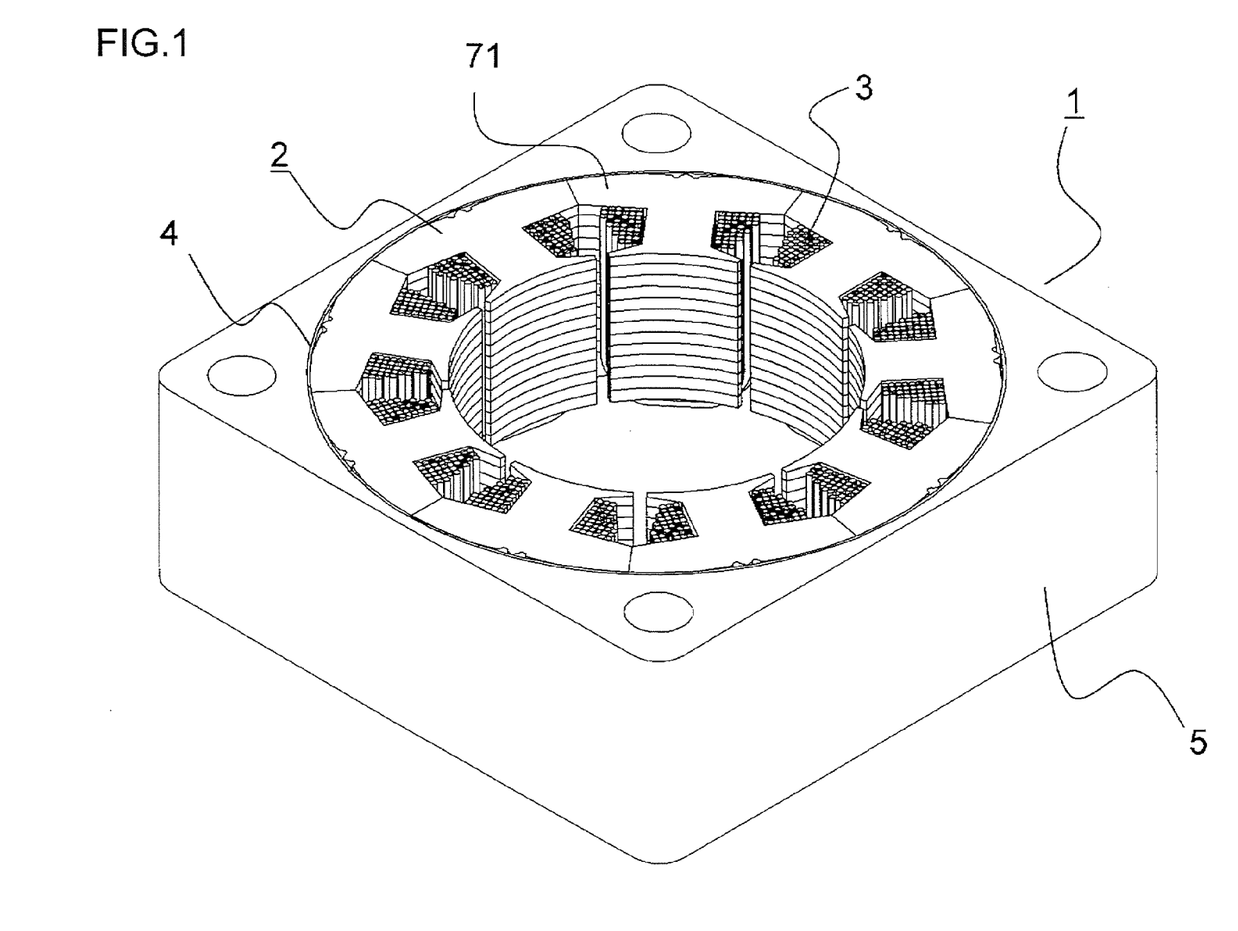
FIG. 1 is a sectional view of a molded stator of a rotary electric machine, according to embodiment 1 of the present invention.

FIG. 1 is a sectional view of a molded stator 1 of a rotary electric machine according to the present invention. The molded stator 1 in FIG. 1 is fabricated through a process in which a plurality of divided laminated cores 71 wound with coils 3 are circularly arranged and fixed by a thin film tape 4, and the assembled unit is placed in a mold and is molded with resin 5 surrounding the circumference of the assembled unit.

Hereinafter, the method for fabricating the molded stator 1 will be sequentially described.

Figure 2:
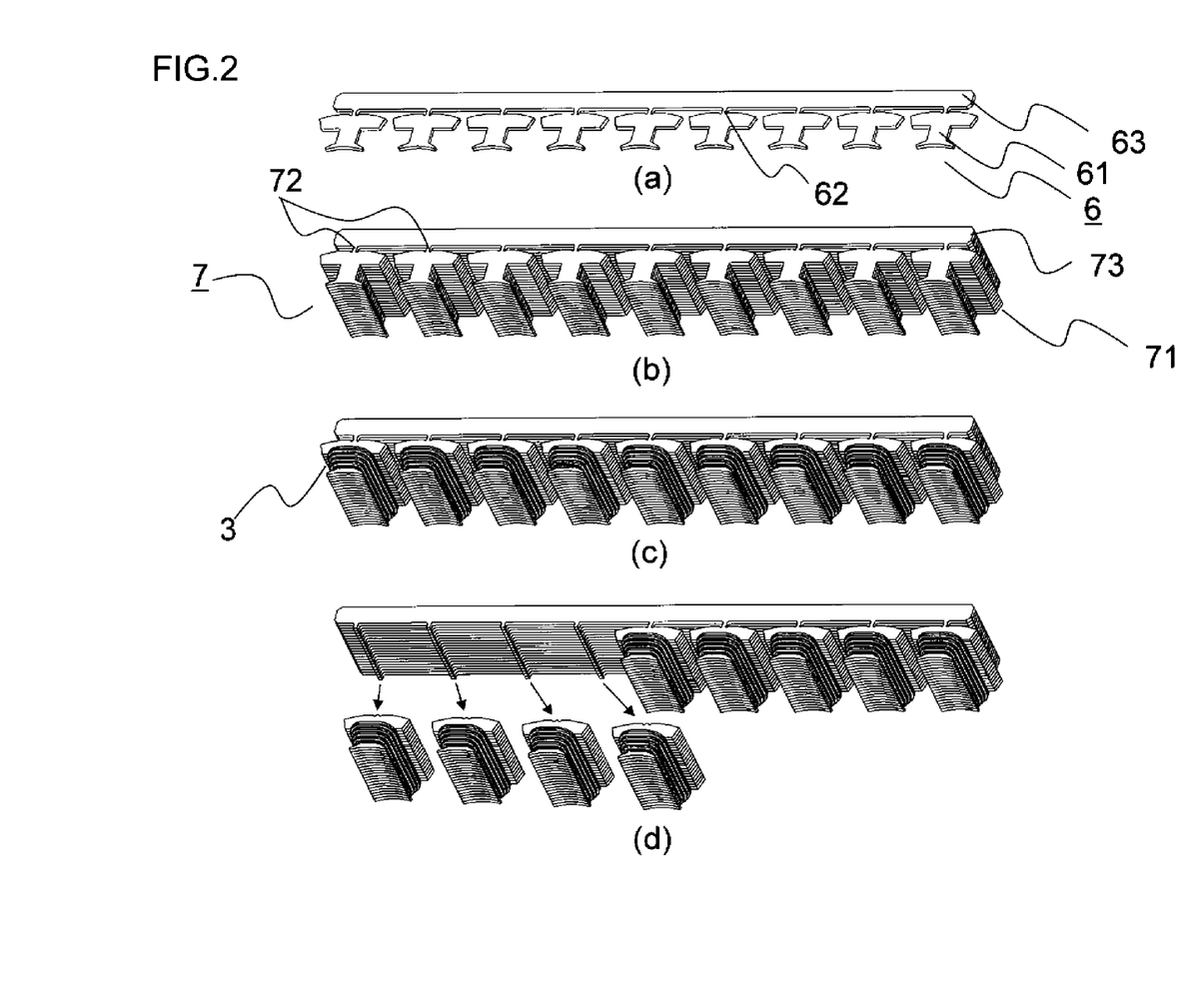
FIG. 2 shows a lamination process, a winding process, and a cutting process in the method for fabricating the molded stator of a rotary electric machine, according to embodiment 1 of the present invention.

FIG. 2 shows a lamination process, a winding process, and a cutting process.

FIG. 2(a) shows the shape of a core sheet 6.

FIG. 2(b) shows a divided-laminated-core group structure 7 composed of a plurality of the core sheets 6 that are laminated.

FIG. 2(c) shows the divided-laminated-core group structure 7 wound with the coils 3.

FIG. 2(d) shows a process of cutting the divided laminated cores 71 from the divided-laminated-core group structure 7 wound with the coils 3.

The processes will be sequentially described from the lamination process.

First, as shown in FIG. 2(a), a plurality of core pieces 61 used for the divided laminated cores 71 that composes a stator 2 are punched out from a magnetic steel sheet. At this time, the individual core pieces 61 are not punched out separately. A predetermined number of the core pieces 61 are punched out such that a middle portion of the outer circumference of a yoke portion of each core piece 61 is connected via a bridge portion 62 to a common joining portion 63.

A plurality of the core sheets 6 punched out as described above are sequentially laminated, whereby the divided-laminated-core group structure 7 is formed as shown in FIG. 2(b). The lamination process is performed as described above.

Next, the winding process will be described.

In the winding process, the coil 3 is wound on a teeth portion of each divided laminated core 71 of the divided-laminated-core group structure 7.

When the coil 3 is wound, a laminated joining portion 73 which is composed of the joining portions 63 of the core sheets 6 that are laminated is fixed by, for example, being pressed from above and below such that the core sheets 6 will not be displaced from each other during winding. In this way, the coils 3 can be accurately wound.

In the winding process, the coils 3 are wound with a predetermined tension applied. Therefore, the core pieces 61 of each divided laminated core 71 wound with the coil 3 cannot be displaced from each other even if the core pieces 61 do not have engagement portions for engaging the adjacent core pieces 61 with each other.

Next, the cutting process will be described.

Figure 3:
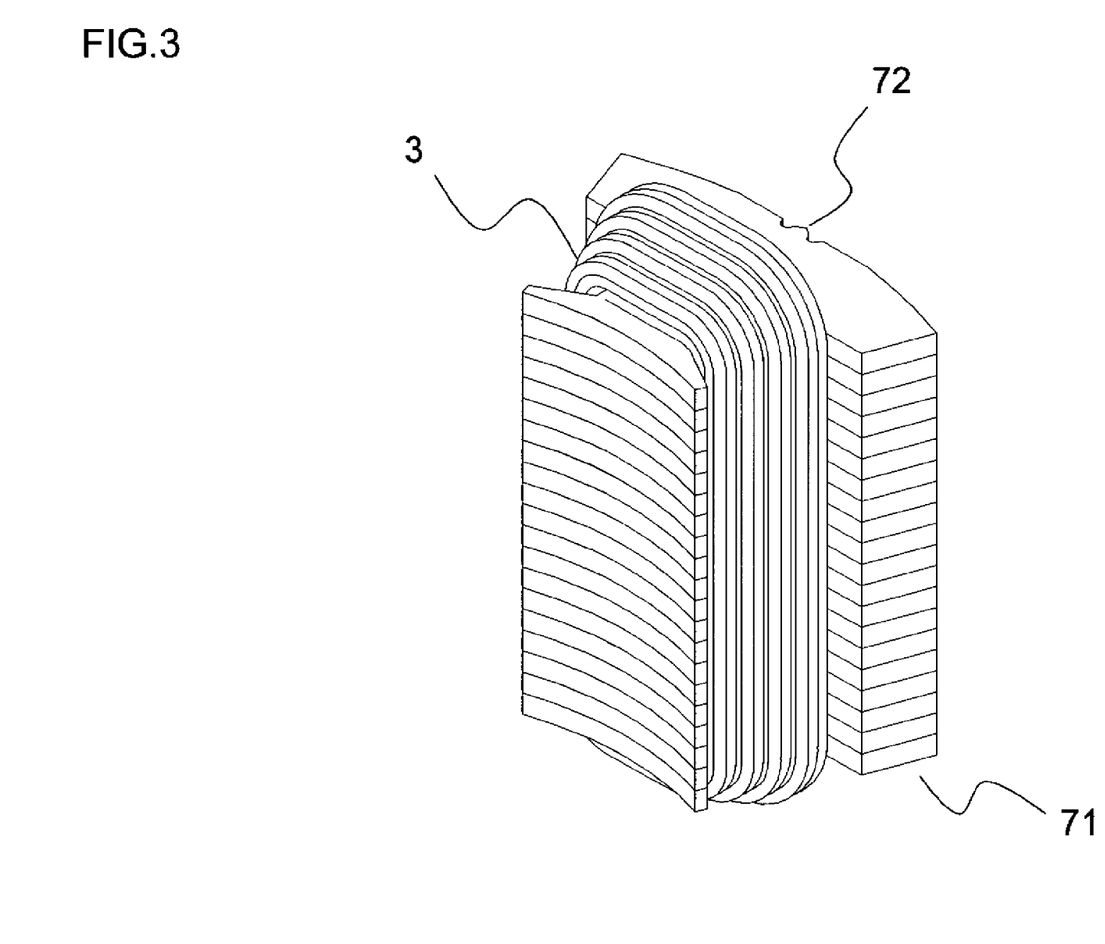
FIG. 3 is a perspective view of a divided laminated core of a stator of a rotary electric machine, according to the present invention.

FIG. 3 is a perspective view of the divided laminated core 71 that has been cut.

As shown in FIG. 2(c), after the coils 3 are wound on all the divided laminated cores 71, while the laminated joining portion 73 are kept in the fixed state, laminated bridge portions 72 are cut whereby the divided laminated cores 71 are cut from the divided-laminated-core group structure 7.

It is noted that whether or not to provide connecting wires between the divided laminated cores 71 in the winding process may be determined depending on rotary electric machines to be fabricated.

Next, the temporary fixing process will be described.

Figure 4:
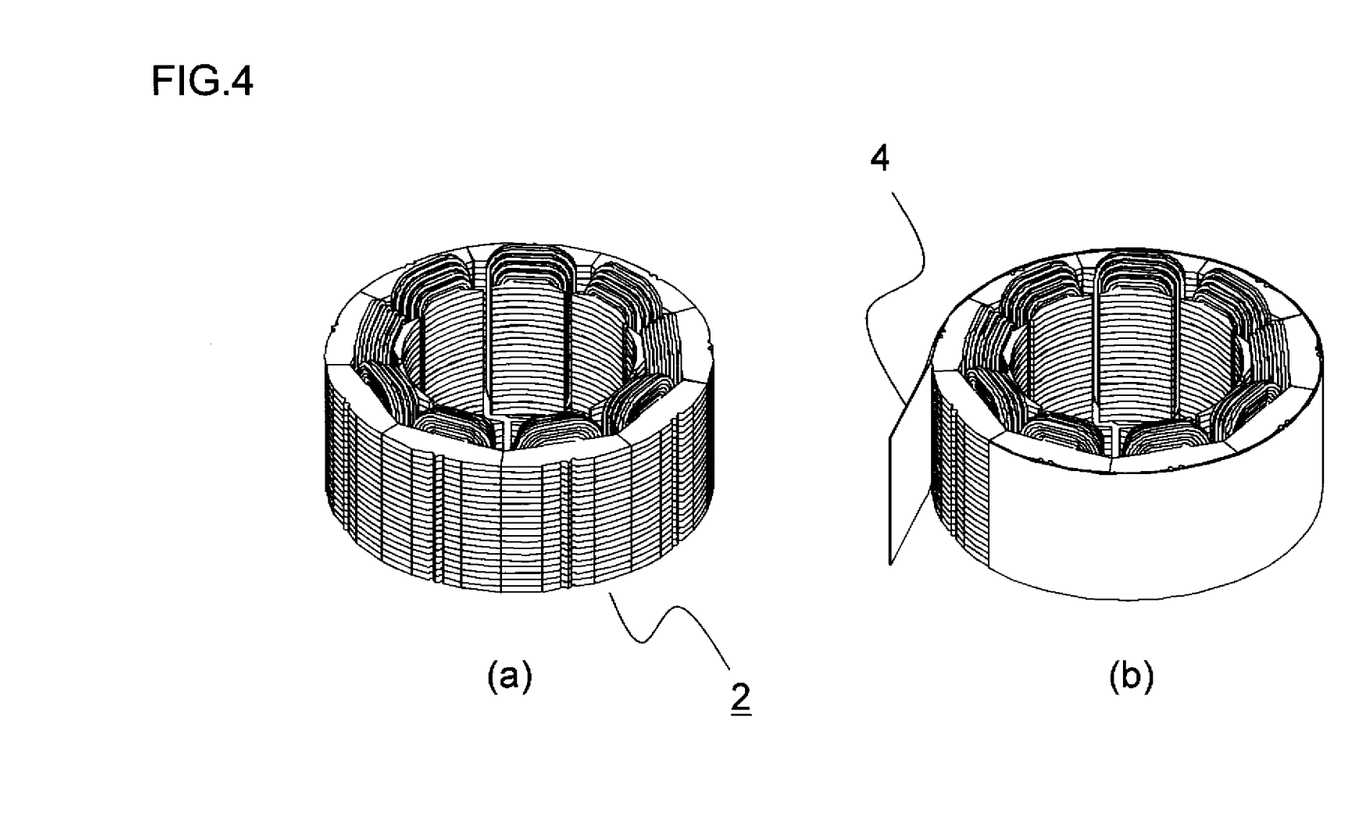
FIG. 4 shows a temporary fixing process in the method for fabricating the molded stator of a rotary electric machine, according to embodiment 1 of the present invention, and shows a process.

FIG. 4 shows the temporary fixing process. As shown in FIG. 4(a), the divided laminated cores 71 are circularly arranged to form the stator 2. Then, as shown in FIG. 4(b), the circumferential portion of the stator 2 is temporarily fixed by the thin film tape 4 having insulation property and heat resistance.

Final adjustment of the shape of the stator 2 is conducted in the subsequent molding process. Therefore, it is not necessary to achieve high accuracy in the fixing of the divided laminated cores 71 in the temporary fixing process.

Next, the molding process will be described.

Figure 5:
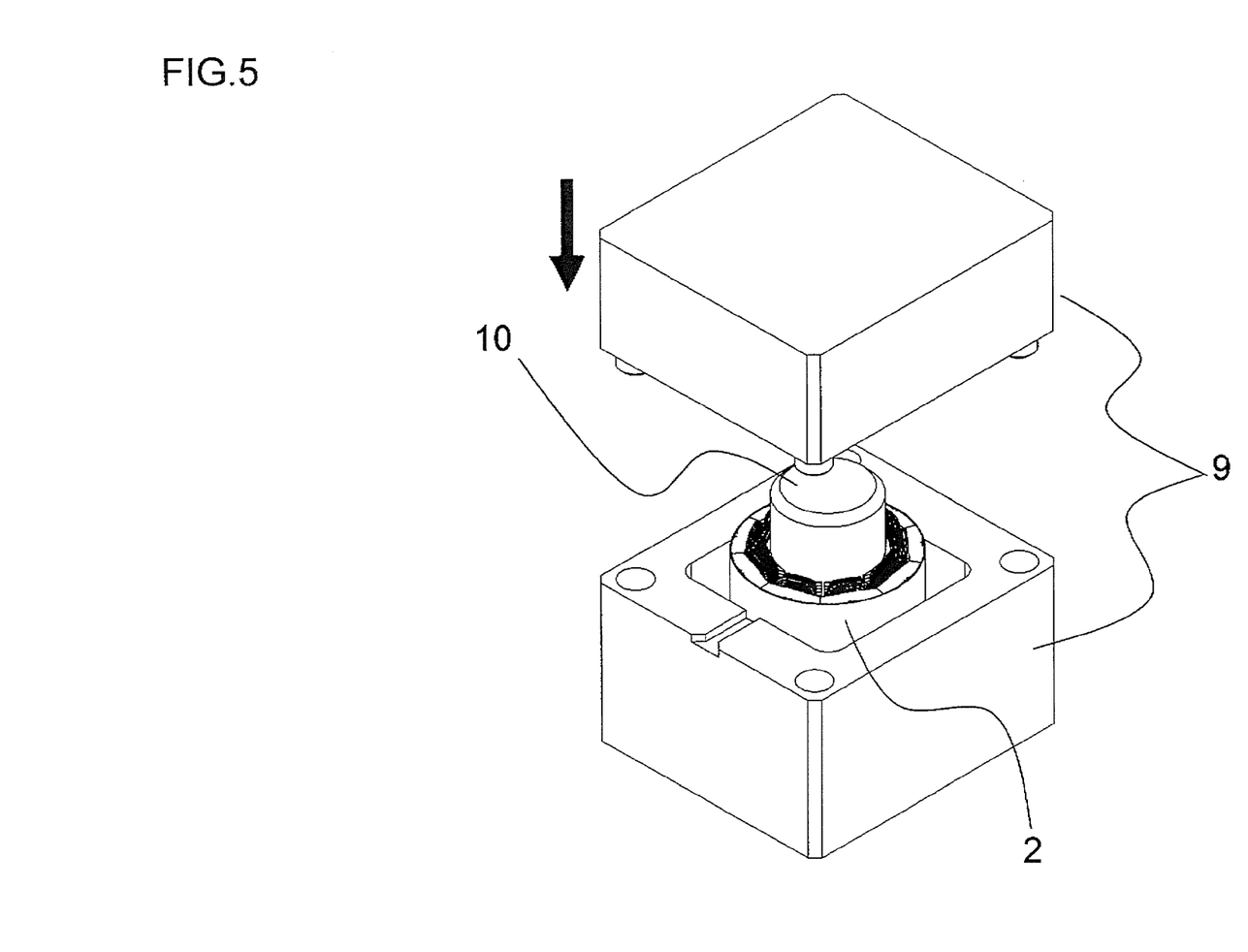
FIG. 5 shows a molding process in the method for fabricating the molded stator of a rotary electric machine, according to embodiment 1 of the present invention.

FIG. 5 shows the molding process.

In the molding process, first, a mold mandrel 10 is inserted into the stator 2 circularly and temporarily fixed in the above temporary fixing process, along the inner circumferential surface of the stator 2, whereby the shape of the stator 2 is adjusted.

The diameter of the mold mandrel 10 is equal to the inner diameter of the stator 2.

Therefore, the inner circumferential surface of the stator 2, i.e., the surfaces, on the inner circumferential side, of the teeth portions of the divided laminated cores 71 are aligned along the outer circumferential surface of the mold mandrel 10, whereby the shape of the stator 2 can be accurately maintained based on the inner circumferential surface of the stator 2 as a reference.

Next, the stator 2 into which the mold mandrel 10 has been inserted along the inner circumferential surface of the stator 2 is placed at a predetermined position inside a mold 9, and the resin 5 is injected through a sprue gate.

Figure 6:
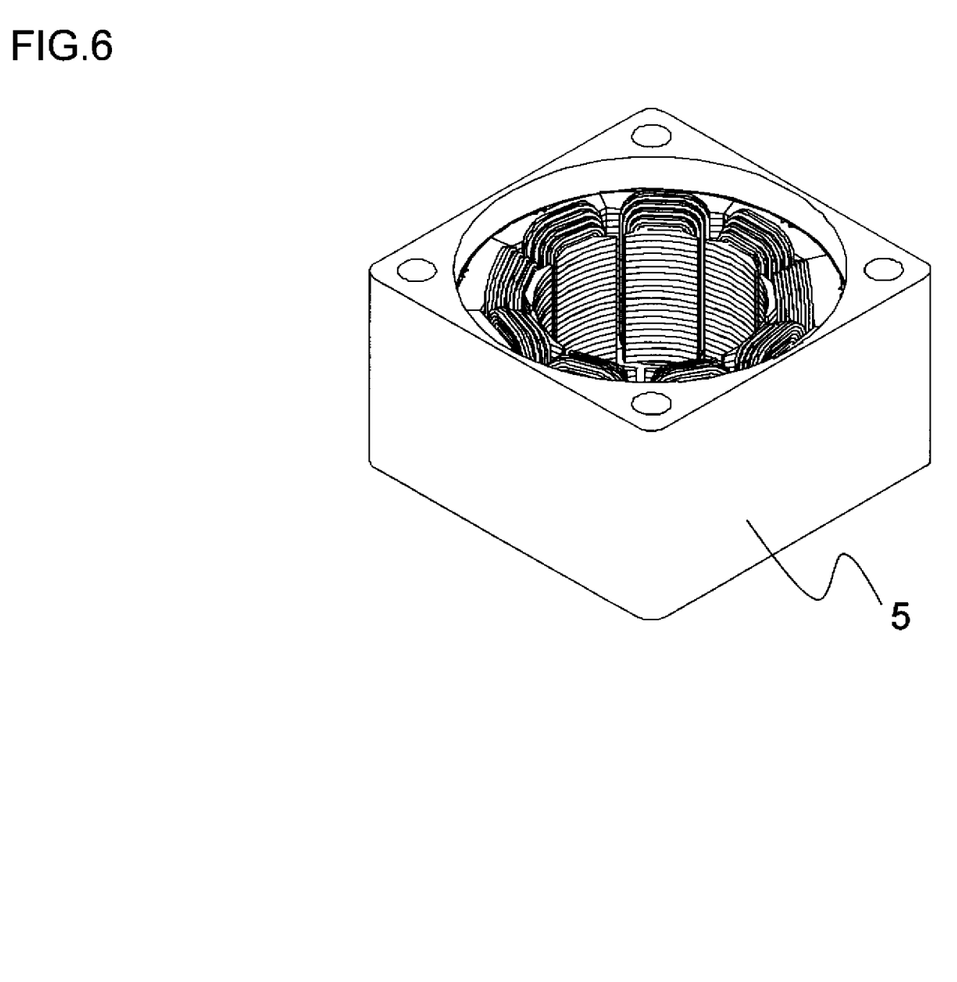
FIG. 6 is a perspective view of the molded stator of a rotary electric machine, according to embodiment 2 of the present invention.

After the resin 5 is solidified, the mold 9 is disassembled and the mold mandrel 10 is extracted. As a result, the molded stator 1 shown in FIG. 6 in which the outer circumferential portion of the stator 2, and the outer circumferential portions of the upper and lower surfaces of the stator 2 are molded with the resin 5, is completed.

In the method for fabricating the molded stator 1 of a rotary electric machine according to embodiment 1, it is not necessary to provide concave and convex portions or the like for engagement on the upper and lower surfaces of each core piece 61 of the divided laminated cores 71 composing the stator 2 of a rotary electric machine, whereby stress applied to the core pieces 61 can be significantly reduced. As a result, the molded stator 1, of a rotary electric machine, having an excellent magnetic characteristic and high efficiency can be accurately fabricated.

In addition, in the molding process, the mold mandrel 10 is inserted into the stator 2 along the inner circumferential surface, whereby the arrangement of the divided laminated cores 71 can be adjusted based on the inner circumferential surface of the stator 2 as a reference. As a result, a cogging torque or a torque ripple can be reduced.

In addition, no gap due to swaging or bonding is formed between the laminated core pieces 61. Therefore, the space factor of each core can be maintained in a preferable state.

In addition, it is not necessary to perform welding, bonding, a process of forming highly accurate pin holes, or the like. Therefore, the fabrication cost can be greatly reduced.

In addition, upon disposal, the molded stator 1 can be easily disassembled merely by melting the resin and cutting the coils because welding or bonding of iron cores is not performed. Thus, the effect that separation and recycling can be easily performed is provided.

Embodiment 2

A method for fabricating a molded stator of a rotary electric machine, according to embodiment 2 of the present invention will be described with reference to the drawings.

It is noted that only a different part from embodiment 1 will be described, and the description of a common part will be omitted.

Figure 7:
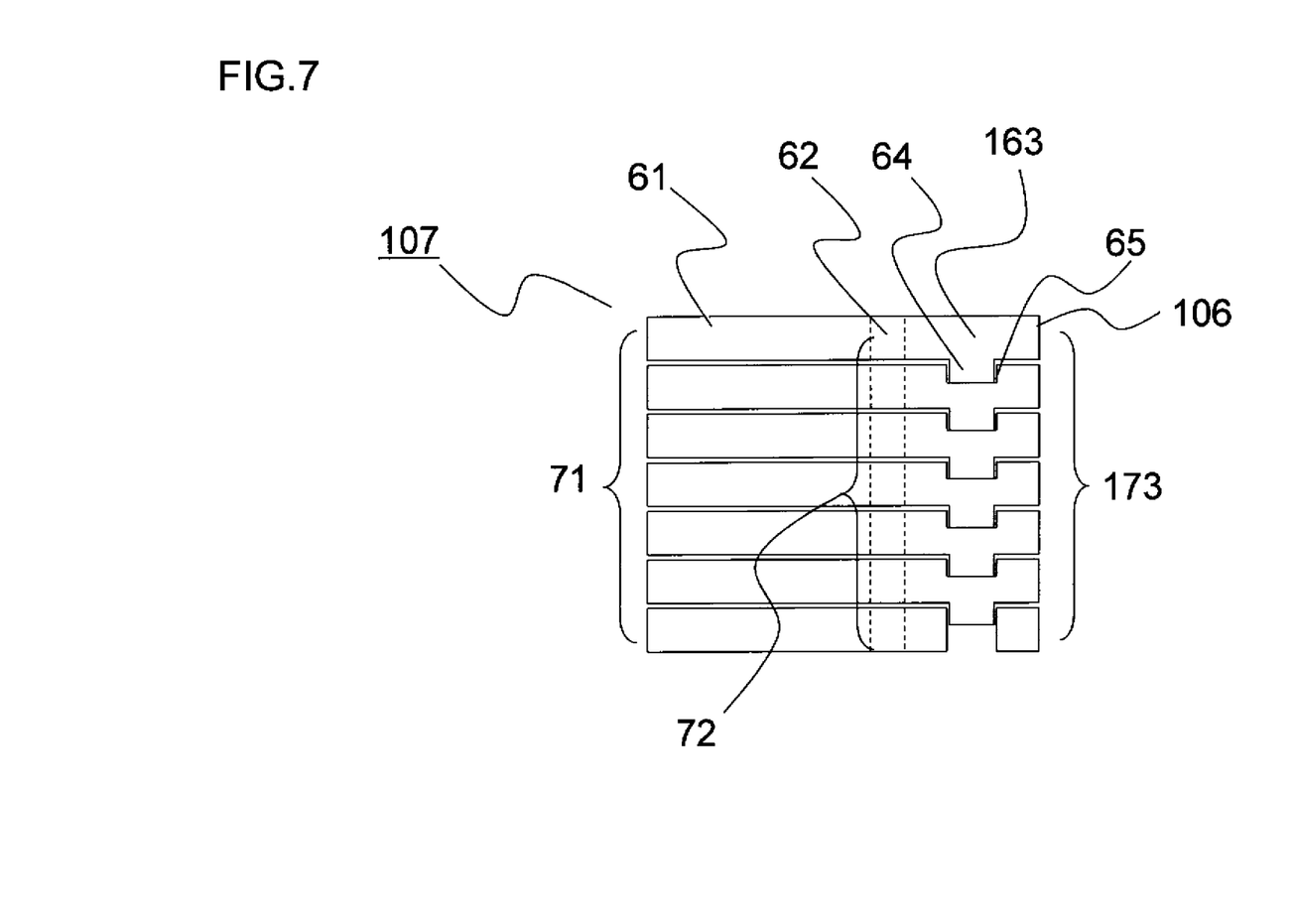
FIG. 7 is a sectional view of a divided-laminated-core group structure used for fabricating a molded stator of a rotary electric machine, according to embodiment 2 of the present invention.

FIG. 7 is a sectional view of a divided-laminated-core group structure 107 according to embodiment 2, along a plane, perpendicular to the long side direction and parallel to the lamination direction, that passes through the bridge portion 62.

Embodiment 1 has employed a method of fixing the core sheets 6 by merely laminating the core sheets 6 and winding the coils 3 on the teeth portions without providing members for engaging the adjacent core sheets 6 with each other.

In the present embodiment, a joining portion 163 of each of core sheets 106 has a concave portion 65 on the upper surface thereof and a convex portion 64 on the lower surface thereof. After the core sheets 106 are laminated, the concave portions 65 and the convex portions 64 are swaged and engaged with each other.

Although in FIG. 7, the uppermost one of the core sheets 106 does not have the concave portion 65 on the upper surface thereof, and the lowermost one has a penetrating hole in place of the concave portion 65 on the upper surface thereof, all the laminated core sheets 106 may have the same configuration.

The other configuration of embodiment 2 is the same as in embodiment 1.

As described above, in the laminated joining portion 173, the adjacent core sheets 106 are engaged with each other, whereby it is ensured that the core sheets 106 are prevented from being displaced from each other upon winding, and the lamination state can be accurately maintained.

In addition, after the coils 3 are wound on the teeth portions of the divided-laminated-core group structure 107, the divided laminated cores 71 are separated by cutting the laminated bridge portions. Therefore, even if stress is applied when the concave portions 65 and the convex portions 64 are swaged, the divided laminated cores 71 are not influenced by the stress.

In addition, since the core sheets 106 are engaged with each other, the divided-laminated-core group structure 107 before the coils 3 are wound can be easily dealt with in comparison with embodiment 1.

Embodiment 3

A method for fabricating a molded stator of a rotary electric machine, according to embodiment 3 of the present invention will be described with reference to the drawings. It is noted that only a different part from embodiment 1 and embodiment 2 will be described, and the description of a common part will be omitted.

Figure 8:
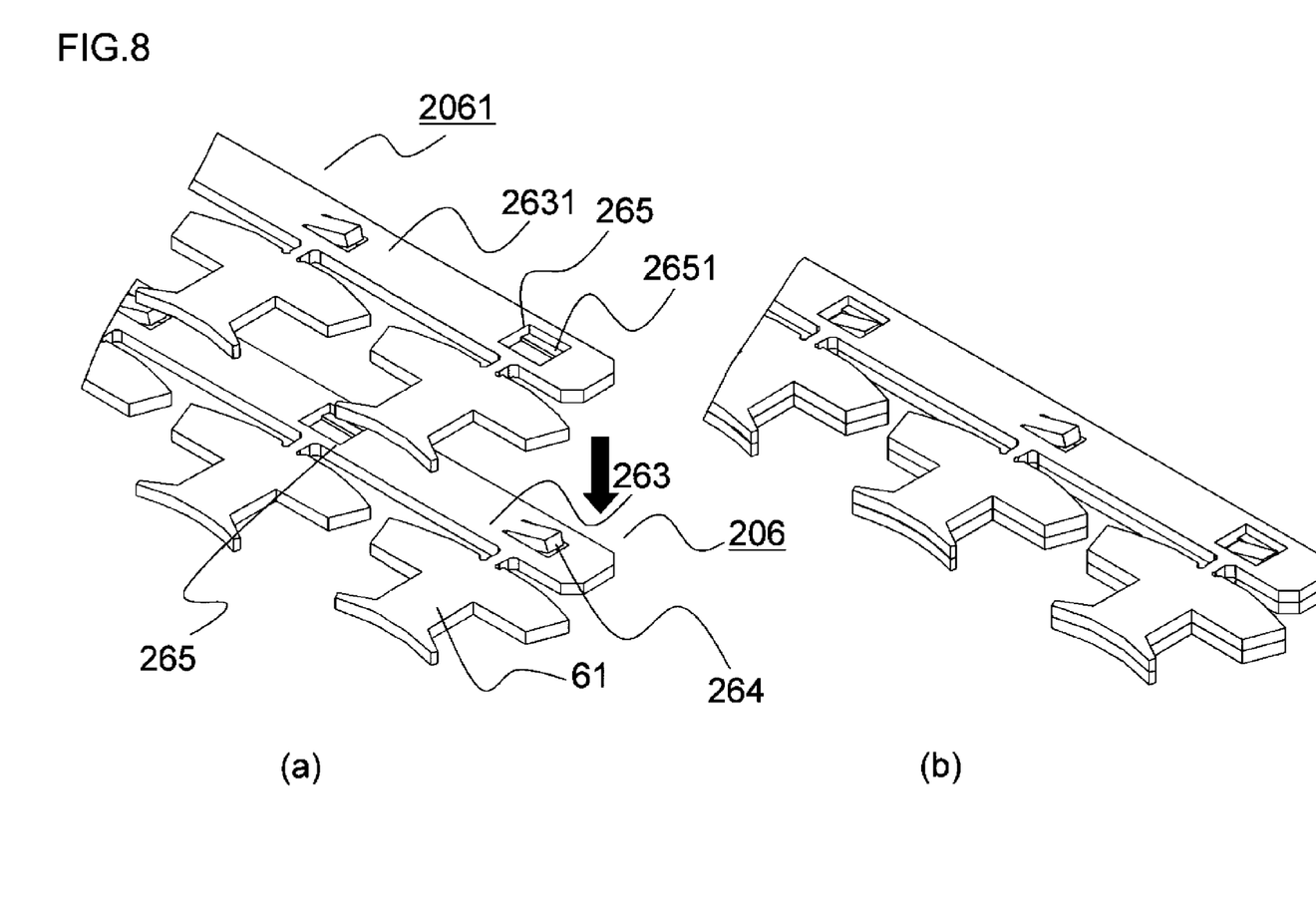
FIG. 8 is a perspective view of concave portions and convex portions provided on the upper and lower surfaces of a joining portion of a core sheet used for fabricating a molded stator of a rotary electric machine, according to embodiment 3 of the present invention.

FIGS. 8(*a*) and 8(*b*) show a variation of the concave portions and the convex portions provided on the upper and lower surfaces of the joining portion of each core sheet.

Figure 9:
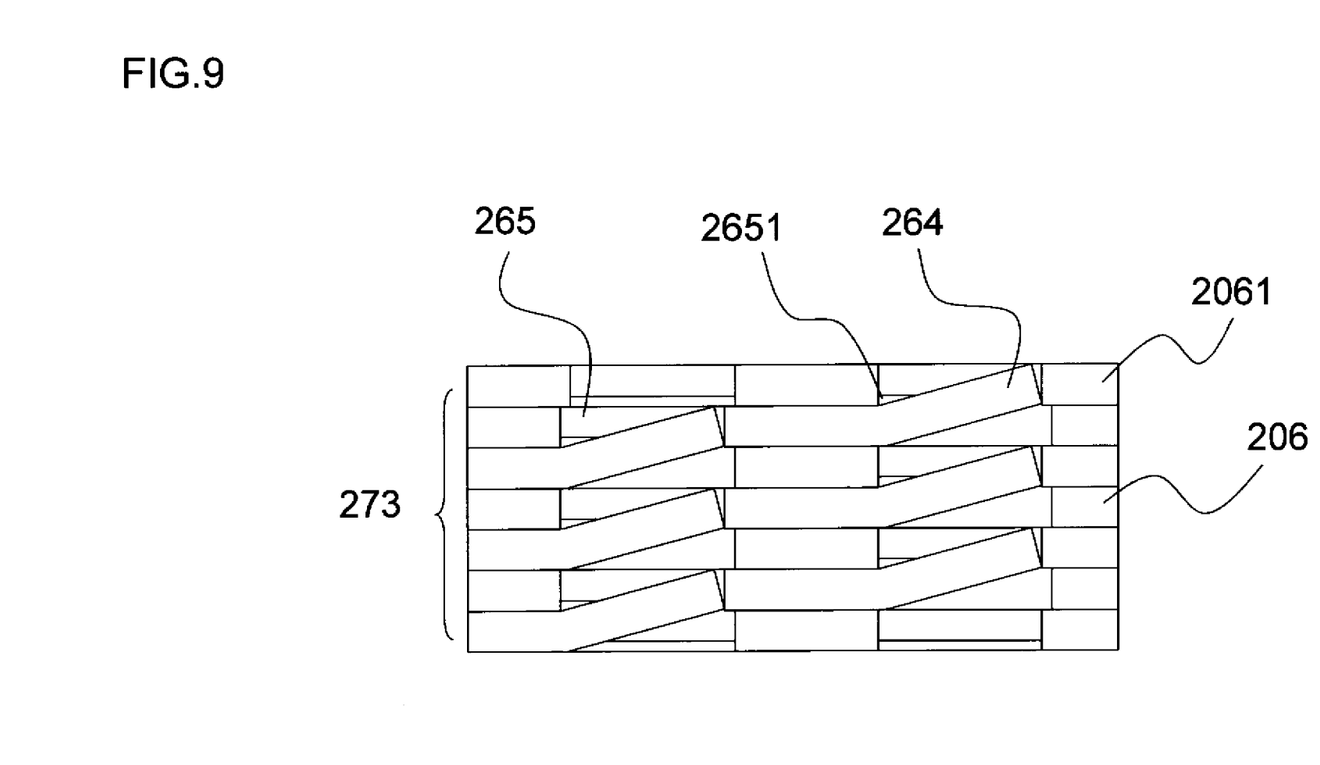
FIG. 9 is a sectional view of a divided-laminated-core group structure used for fabricating the molded stator of a rotary electric machine, according to embodiment 3 of the present invention.

FIG. 9 is a sectional view of a laminated joining portion 273 of a divided-laminated-core group structure composed of core sheets 206 and 2061 that are alternately laminated, as divided in half along the long side direction and the lamination direction.

A joining portion 263 of the core sheet 206 drawn on the lower side in FIG. 8(*a*) has convex portions 264 and opening portions 265, which are alternately provided starting from the rightmost convex portion 264 as shown in FIG. 8(*a*).

A joining portion 2631 of the core sheet 2061 drawn on the upper side in FIG. 8(*a*) has the opening portions 265 and the convex portions 264, which are alternately provided starting from the rightmost opening portion 265 as shown in FIG. 8(*a*).

Although the opening portions 265 and the convex portions 264 are alternately provided on each core sheet in the drawing, the uppermost core sheet used for the divided laminated cores may not have the convex portions 264, and the lowermost core sheet may not have the opening portions 265.

The convex portions 264 are formed by cutting and bending the corresponding portions of the joining portions 263 and 2631 of the core sheets 206 and 2061.

The forming procedure is as follows. A predetermined portion of each of the joining portions 263 and 2631 is cut, by press cutting, along the three sides of the predetermined portion other than one side which is a supporting portion of the convex portion 264 and is to be subjected to a bending process.

Then, the cut portion is bent by being pressed from the lower surface, whereby the convex portion 264 is formed.

A plate spring 2651 is provided on one of the inner wall surfaces of each opening portion 265, in order to maintain the contact pressure with the convex portion 264 and increase the lamination accuracy with respect to the horizontal direction and the vertical direction of the laminated core sheets 206 and 2061.

In the drawing, the plate spring 2651 is provided on the lower end portion of one, of the inner wall surfaces of the opening portion 265, that is farthest from the bridge portion. As a result, the plate spring 2651 can be flexed upward or downward.

The width of the convex portion 264 in a direction perpendicular to the long side direction of the joining portion 263 is designed to be slightly longer than the interval between the plate spring 2651 and the wall surface opposite to the plate spring 2651.

When the core sheets 206 and 2061 are alternately laminated and pressed from above and below, the plate springs 2651 are flexed upward in the drawing, thereby pressing the convex portions 264 to the inner wall surfaces, of the opening portions 265, opposite to the plate springs 2651.

As a result, the side surfaces, of all the convex portions 264, on the core piece 61 side are equally pressed to the inner wall surfaces, of the opening portion 265, on the core piece 61 side.

The above-described configuration further increases the lamination accuracy of the core sheets, as well as providing the same effect as in embodiment 2.

Embodiment 4

A method for fabricating a molded stator of a rotary electric machine, according to embodiment 4 of the present invention will be described with reference to FIG. 9. It is noted that only a different part from embodiment 3 will be described, and the description of a common part will be omitted.

In embodiment 3, the press-cutting process for forming the convex portions has been described. However, in the case where a stator of a small-size rotary electric machine is to be fabricated and the core sheets are small and thin, the convex portions, the opening portions, and the plate springs may be formed through microfabrication using etching.

In the case where the entire core sheet composed of the core pieces is subjected to etching, the opening portion is first formed, and then the spring portion is processed to become thin. In this case, the three sides of the plate spring 2651 are fixed to the wall surfaces.

However, as shown in FIG. 9, when the core sheets are laminated and pressed, a portion of the plate spring 2651 that the convex portion 264 first comes into contact with is away from the wall surfaces of the opening portion 265.

Therefore, even if the plate spring 2651 is formed by etching, the plate spring 2651 is flexed upward, thereby pressing the convex portion 264 to the wall surface of the opening portion.

In addition, punching distortion or welding distortion does not occur in the joining portion. Therefore, the molded stator with decreased deterioration of the magnetic characteristic can be provided.

Embodiment 5

A method for fabricating a molded stator of a rotary electric machine, according to embodiment 5 of the present invention will be described with reference to the drawings. It is noted that only a different part from embodiment 2 will be described, and the description of a common part will be omitted.

In embodiment 2, the concave portions and the convex portions are provided on the upper and lower surfaces of the joining portion 163 of each core sheet 106 to be laminated, and the concave portions and the convex portions are swaged with each other, whereby the core sheets 106 are engaged with each other via the joining portions 163.

Figure 10:
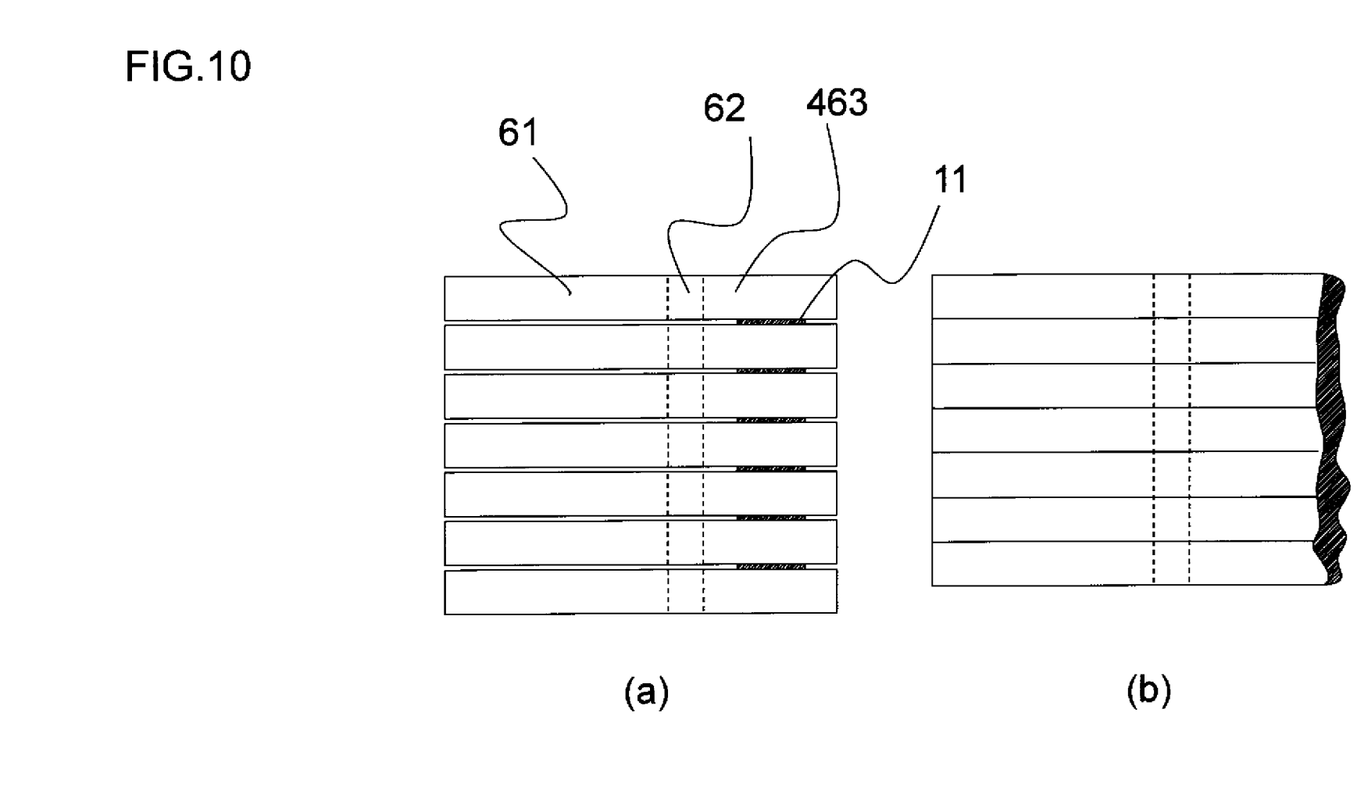
FIG. 10 is a sectional view of a divided-laminated-core group structure used for fabricating a molded stator of a rotary electric machine, according to embodiment 5 of the present invention.

In the present embodiment, joining portions 463 of the adjacent core sheets are engaged with each other by another method.

FIG. 10(a) shows the core sheets fixed by an adhesive agent 11.

FIG. 10(b) shows end portions of the joining portions that are welded.

Each of the above methods provides the same effect as in embodiment 2.

Embodiment 6

A method for fabricating a molded stator of a rotary electric machine, according to embodiment 6 of the present invention will be described with reference to the drawings. It is noted that only a different part from embodiment 1 will be described, and the description of a common part will be omitted.

Figure 11:
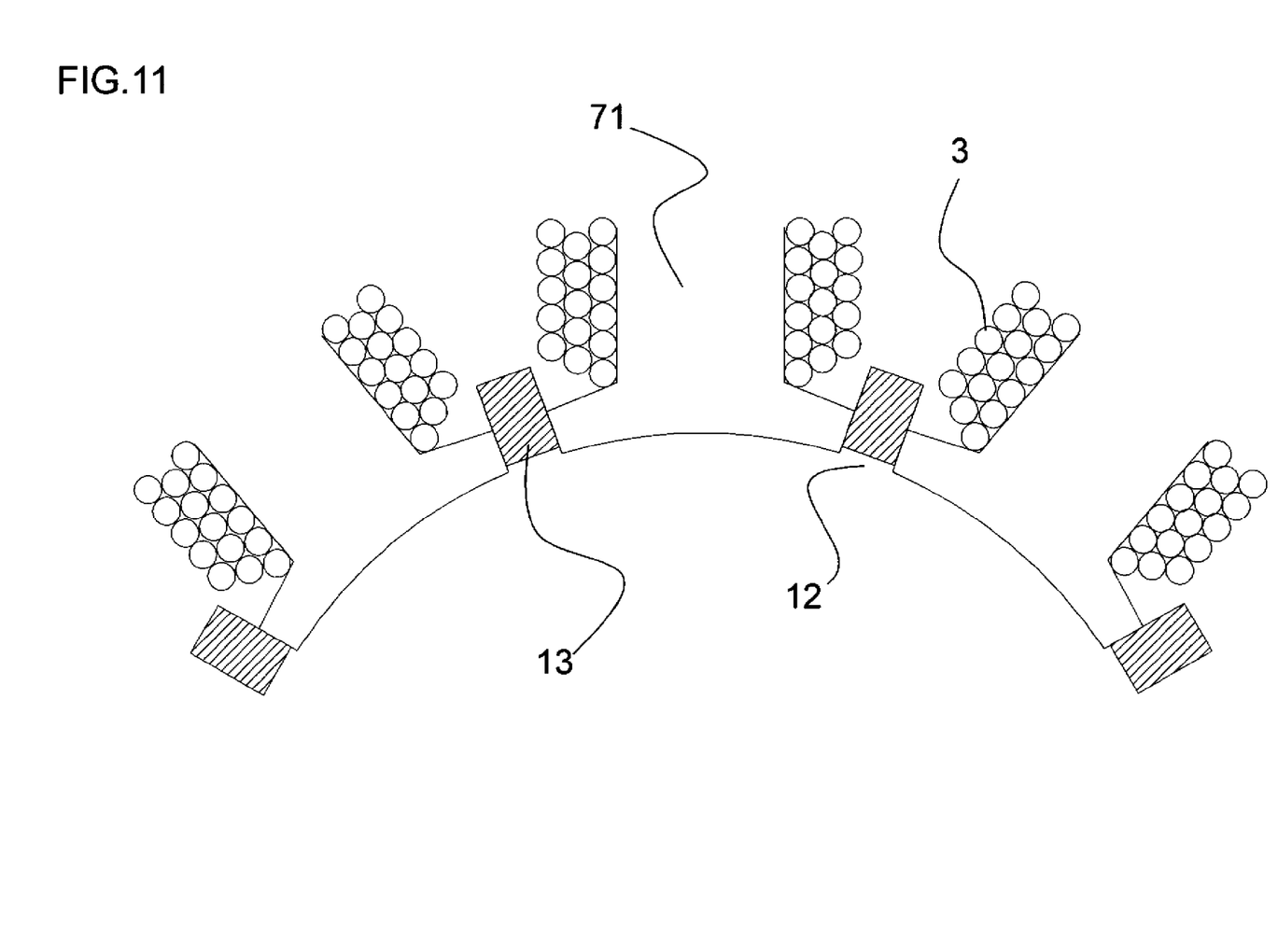
FIG. 11 is a sectional view of a main part of a molded stator of a rotary electric machine, according to embodiment 6 of the present invention.

FIG. 11 is a sectional view of a main part of the molded stator of a rotary electric machine, according to embodiment 6 of the present invention.

In the present embodiment, the molding process further comprises a step of inserting a plate-like member 13 into a slot opening 12 present between the adjacent teeth portions of the stator so as to be held, in parallel to the rotational axis of the stator, in the slot opening 12.

The plate-like member 13 is inserted into the slot opening 12 prior to the step of inserting the mold mandrel 10 into the stator along the inner circumferential surface. Alternatively, instead of the mold mandrel 10, by using another mold mandrel capable of holding the plate-like member 13, the plate-like member 13 is inserted at the same time as insertion of the mold mandrel.

Thus, in the molding process, the intervals between the slot openings 12 can be maintained to have uniform lengths, and the shape accuracy of the molded stator is maintained in a preferable state. As a result, a stator of a rotary electric machine having high efficiency with decreased deterioration of the magnetic characteristic can be provided.

The invention claimed is:

1. A method for fabricating a molded stator of a rotary electric machine, in which: a coil is wound on a divided laminated core composed of a plurality of core pieces that are laminated; a plurality of the divided laminated cores are circularly joined; and the outer circumferential surfaces of the plurality of divided laminated cores are molded and fixed, the method comprising:

a lamination step of
preparing a plurality of core sheets in which core pieces used in the same lamination layer of the divided laminated cores are connected to a joining portion via bridge portions respectively connected to middle portions of the outer circumferences of back yoke portions of the core pieces, and
laminating the core sheets to form a divided-laminated-core group structure;

a winding step of winding the coil on a teeth portion of each divided laminated core of the divided-laminated-core group structure;

a cutting step of cutting the bridge portions of the divided laminated cores wound with the coils, thereby separating the divided laminated cores from the divided-laminated-core group structure;

a temporary fixing step of forming a stator by circularly arranging the divided laminated cores that have been cut, and temporarily fixing the outer circumferential portion of the stator; and a molding step of
inserting an axial rod having a diameter equal to the inner diameter of the stator, into the stator along the inner circumferential surface of the stator,
placing the stator into which the axial rod has been inserted, in a mold, and
molding an outer circumferential surface of the stator with resin.

2. The method for fabricating a molded stator of a rotary electric machine, according to claim 1, wherein
the joining portion of each core sheet has a concave portion on one of the upper and lower surfaces thereof, and a convex portion on the other one of the upper and lower surfaces, and
in the lamination step, the adjacent core sheets are fixed by the concave portion and the convex portion being engaged with each other.

3. The method for fabricating a molded stator of a rotary electric machine, according to claim 2, wherein
the convex portion is formed by cutting and bending the core sheet.

4. The method for fabricating a molded stator of a rotary electric machine, according to claim 3, wherein
a plate spring for, when the adjacent core sheets are engaged, generating a force component that presses the convex portion in a direction perpendicular to the lamination direction of the core sheets, is provided in an opening portion of the concave portion.

5. The method for fabricating a molded stator of a rotary electric machine, according to claim 1, wherein
in the lamination process, the adjacent core sheets are fixed by the joining portions being bonded with each other.

6. The method for fabricating a molded stator of a rotary electric machine, according to claim 1, wherein
in the lamination process, the adjacent core sheets are fixed by the joining portions being welded with each other.

7. The method for fabricating a molded stator of a rotary electric machine, according to claim 1, wherein
in the temporary fixing process, the outer circumferential portion of the stator is temporarily fixed by a thin-film heat-insulating sheet.

8. The method for fabricating a molded stator of a rotary electric machine, according to claim 1, wherein
in the molding step, a plate-like member is inserted into a slot opening portion present between teeth portions of the adjacent divided laminated cores so as to be held, in parallel to the axial direction of the stator, in the slot opening.

* * * * *